(12) United States Patent
Rajamani et al.

(10) Patent No.: US 6,567,016 B1
(45) Date of Patent: May 20, 2003

(54) TYPEMATIC GUARD PROTOCOL FOR WIRELESS KEYBOARDS

(75) Inventors: Krishnan Rajamani, Portland, OR (US); Harley D. Johnson, Portland, OR (US); Steven C. Lo, Portland, OR (US); John L. Reid, Portland, OR (US); Venkatakrishna U. Yellepeddy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/454,143

(22) Filed: Dec. 3, 1999

(51) Int. Cl.[7] ............................................... H03M 13/47
(52) U.S. Cl. ........................................... 341/24; 341/26
(58) Field of Search ............................. 341/24, 176, 22, 341/26, 23; 379/368; 708/145, 142; 340/825.24, 825.25, 825.69, 825.72, 825.22; 348/734

(56) References Cited

U.S. PATENT DOCUMENTS 5,287,526 A * 2/1994 Wolf et al. .................. 345/172
5,585,789 A * 12/1996 Haneda ...................... 340/10.3
5,859,599 A * 1/1999 Shiga .......................... 341/173
5,920,308 A * 7/1999 Kim ............................. 341/22
5,958,023 A * 9/1999 Klein ........................... 341/22
6,031,470 A * 2/2000 Asari et al. ................. 341/126
6,052,116 A * 4/2000 Takagi ........................ 345/158
6,072,468 A * 6/2000 Hocker et al. ............. 345/157
6,081,207 A * 6/2000 Batio ........................... 341/20
6,138,050 A * 10/2000 Schneider et al. ............ 341/22
6,278,877 B1 * 8/2001 Brederveld et al. ......... 455/434

* cited by examiner

Primary Examiner—Michael Horabik
Assistant Examiner—Hung Dang
(74) Attorney, Agent, or Firm—Trop, Pruner & Hu, P.C.

(57) ABSTRACT

A wireless keyboard may be provided with a guard protocol which prevents unintended typematics. An alive signal may be periodically generated to advise a host processor-based system that the keyboard communication link is still effective. If the host processor-based system receives a key make signal but does not receive a break signal or an alive signal, the processor-based system may deduce that the link has gone inactive, and may generate its own break signal. This avoids unnecessary power consumption and unnecessary typematics.

17 Claims, 3 Drawing Sheets

| 0 | 1 | 2 | 3 |
|---|---|---|---|
| MAKE | ALIVE | ALIVE | TYPEMATIC |

| 4 | 5 | 6 | HOST |
|---|---|---|---|
| MAKE | – | – | BREAK |

TYPEMATIC GUARD PROTOCOL FOR WIRELESS KEYBOARDS

BACKGROUND

This invention relates generally to processor-based systems and in particular embodiments to the use of wireless keyboards in connection with processor-based systems.

Wireless keyboards enable computer users to input data from positions spaced from the remainder of a processor-based system. This gives the user the additional freedom to make data entries without requiring the user to sit proximate to the processor-based system.

Each time the keyboard sends a wireless key make code to the host computer indicating that a key has been depressed, the host computer awaits a key break code indicating that the key has been released. If the key make code is not followed within a predetermined time frame by the break code, the operating system automatically repeats the key represented by the make code. The delay between the make code and automatic repeat is user configurable. This automatic repeat will stop when a break or another make code is received.

If a wireless keyboard loses its wireless link with the host computer, after sending the key make code, but before the key break code is sent, the operating system of the host computer may automatically repeat the key indefinitely. This becomes a serious problem because the keyboard may have a relatively limited effective range. If the keyboard is moved too far away from the host processor-based system, the link may be lost. Similarly, if severe interference is encountered, the link may be lost as well.

The phenomenon where the key is automatically repeated is called a typematic. The uncontrolled typematic that ensues can cause undesirable behavior on the processor-based system.

Thus there is a continuing need for ways to prevent uncontrolled typematics when using wireless keyboards.

SUMMARY

In accordance with one aspect, a method includes communicating, over a wireless link, that a key has been operated on a wireless keyboard. A wireless signal is generated from the wireless keyboard to test whether the wireless link is still working.

Other aspects are set forth in the accompanying detailed description and claims.

DETAILED DESCRIPTION

Figure 1:
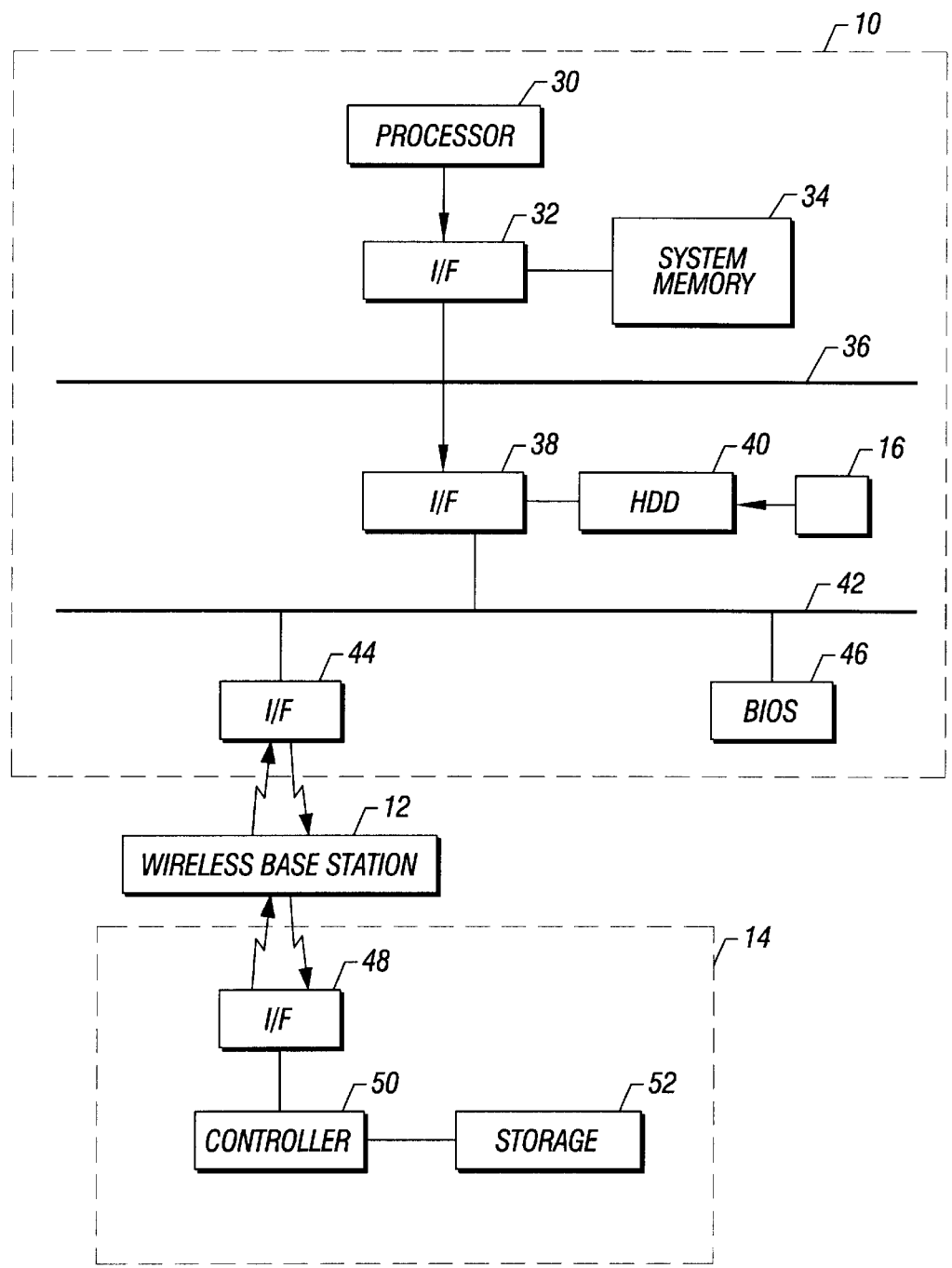
FIG. 1 is a block depiction of one embodiment of the system according to the present invention.

Referring to FIG. 1, a processor-based system 10 may include a wireless link with a wireless base station 12 which in turn may maintain a wireless link with a wireless keyboard 14. The base station 12 may increase the range of the wireless keyboard with respect to the processor-based system 10. However, in some embodiments in the present invention, the wireless base station 12 may be eliminated, and the wireless keyboard 14 may communicate directly with the processor-based system 10.

The processor-based system 10 may be a desktop computer, a portable computer, a handheld device, an appliance, or a set-top box, as examples. The wireless keyboard 14 may be a wireless computer keyboard, a remote control unit (RCU) which communicates with a processor-based system, which in some embodiments may be a set-top box, or other wireless peripherals such as game pad.

The communication between the systems 10, 12, and 14 may be by conventional infrared or radio wave links as examples. In such cases, the wireless base station 12 may act, effectively, as a repeater. The wireless base station 12 may essentially receive signals from the wireless keyboard 14, and retransmit those signals to the processor-based system 10.

A processor-based system 10 may include a processor 30 coupled to an interface 32 such as a bridge or a chipset. Interface 32 may, for example, couple a system memory 34 and a bus 36. The bus 36 in turn may be coupled to another interface 38 which may also be a bridge or part of a chipset. The interface 38 may in turn be coupled to a hard disk drive 40 or other storage medium such as a floppy drive, a compact disk drive, a digital video disk drive, a flash memory or the like. Software 16 may be stored on the hard disk drive 40 in one embodiment to the present invention.

The second bus 42 may be coupled to an airwave interface 44 and a basic input/output system (BIOS) storage 46. The interface 44 receives signals from the wireless base station 12 or the wireless keyboard 14 and converts those signals into a form compatible with the processor-based system 10.

The keyboard 14 may be conventional in many respects and may include a wireless interface 48 which is coupled to a key code generating controller 50. The controller 50 in turn may be coupled to a storage 52 which may store operating protocols for the wireless keyboard 14. Generally, the wireless keyboard 14 is battery-powered.

After the user activates a key in the wireless keyboard 14, a key make code is transmitted from the wireless keyboard 14 to the wireless base station 12 to the processor-based system 10. If after a given period of time, a key break code is not received, the operating system of the processor-based system 10 may automatically repeat the key activation as though the key were repeatedly pressed.

In one embodiment of the present invention, at periodic intervals, the keyboard 14 automatically generates an alive signal. The processor-based system 10 is advised by the alive signal that the wireless link is still active and that the absence of a break signal may be indicative of a typematic for automatically repeating a key actuation.

In another embodiment of the present invention, the alive signal is automatically produced after the make code is generated. In one such embodiment, the alive signal may be produced twice in the typematic period. The typematic period corresponds to the passage of time which is recognized as a typematic.

Figures 2, 3, 4:
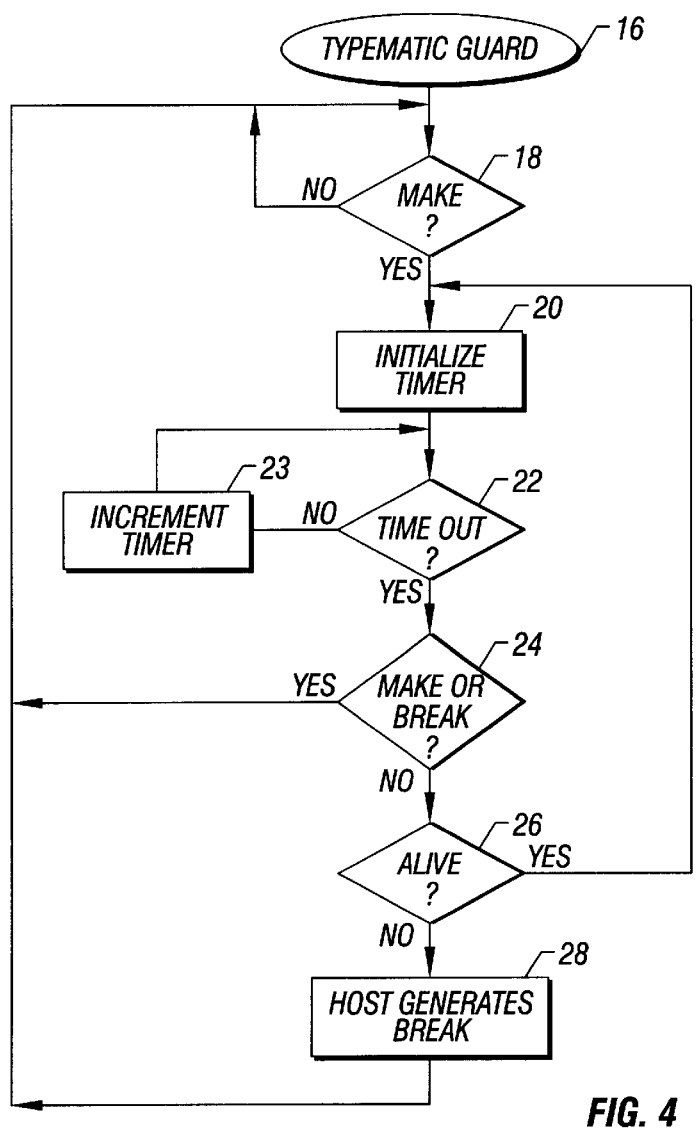
FIG. 2 is an example of a sequence of codes that may be generated from a wireless keyboard in accordance with one embodiment, of the present invention.
FIG. 3 is another example of a sequence of wireless codes that may be generated from a wireless keyboard in accordance with one embodiment of the present invention.
FIG. 4 is a flowchart for software for implementing one embodiment of the present invention.

Thus, referring to FIG. 2, a key make code may be produced at time interval 0, and an alive signal may be produced automatically by the keyboard at time intervals 1 and 2. If the processor-based system 10 receives those alive signals, the processor-based system 10 knows that the absence of a key break code was not the result of loss of the communication link between the keyboard 14 and the system 10. Thus, having failed to receive a break code, the host driver software automatically initiates a typematic or automatic repeat of the key activated at time interval 0.

In some embodiments of the present invention, the alive signal may only be generated after a key make code has been produced. In other embodiments, the alive signal may be produced automatically in any open time period.

The key make code may be received by the host processor-based system 10 and then no other signals may be received for the period which corresponds to a typematic. Thus, referring to FIG. 3, in time interval 4, a key make code is received. However, in time interval 5 and time interval 6, no alive signal, make or break code is received. As a result of this absence of any signal, the processor-based system 10 knows that the communication link has been interrupted and automatically initiates a host generated break signal. Thus the absence of any signal is not recognized as a typematic. The user may be notified, for example by graphical user interface, that the wireless link has failed.

In some embodiments, the alive signal may be a packet distinguished from the make and break packet types. In this case, software may filter out these packets and use them for resetting timers. In another embodiment of the present invention, the alive packet may be a duplicate of a preceding make packet. In this case, the driver processes the alive packet as a normal make packet, but also resets the timer as described previously.

Referring next to FIG. 4, software 16, in accordance with one embodiment of the invention, which may be stored on the hard disk drive 40, begins by determining whether a make code has been received as indicated in diamond 18. A timer is initialized as indicated in block 20. In diamond 22, a check determines whether the timer has timed out. The timer times out, for example, when it reaches a count that exceeds a predetermined count which may be preset by the user. If the timer has not timed out, the timer count is incremented as indicated in block 23. When the timer finally times out, a check at diamond 24 determines whether a make or a break code was received during the timer defined period. In this case, the timer defined period may be equal to the typematic time period. If a make or break code has been received in the typematic period, the flow iterates back to the beginning and waits for the next make signal.

If however no make or break code was received during the typematic period, a check at diamond 26 determines whether an alive signal was received. If so, the timer may be initialized and the flow continues. If not, the host may automatically generate a key break code as indicated at block 28.

Figure 5:
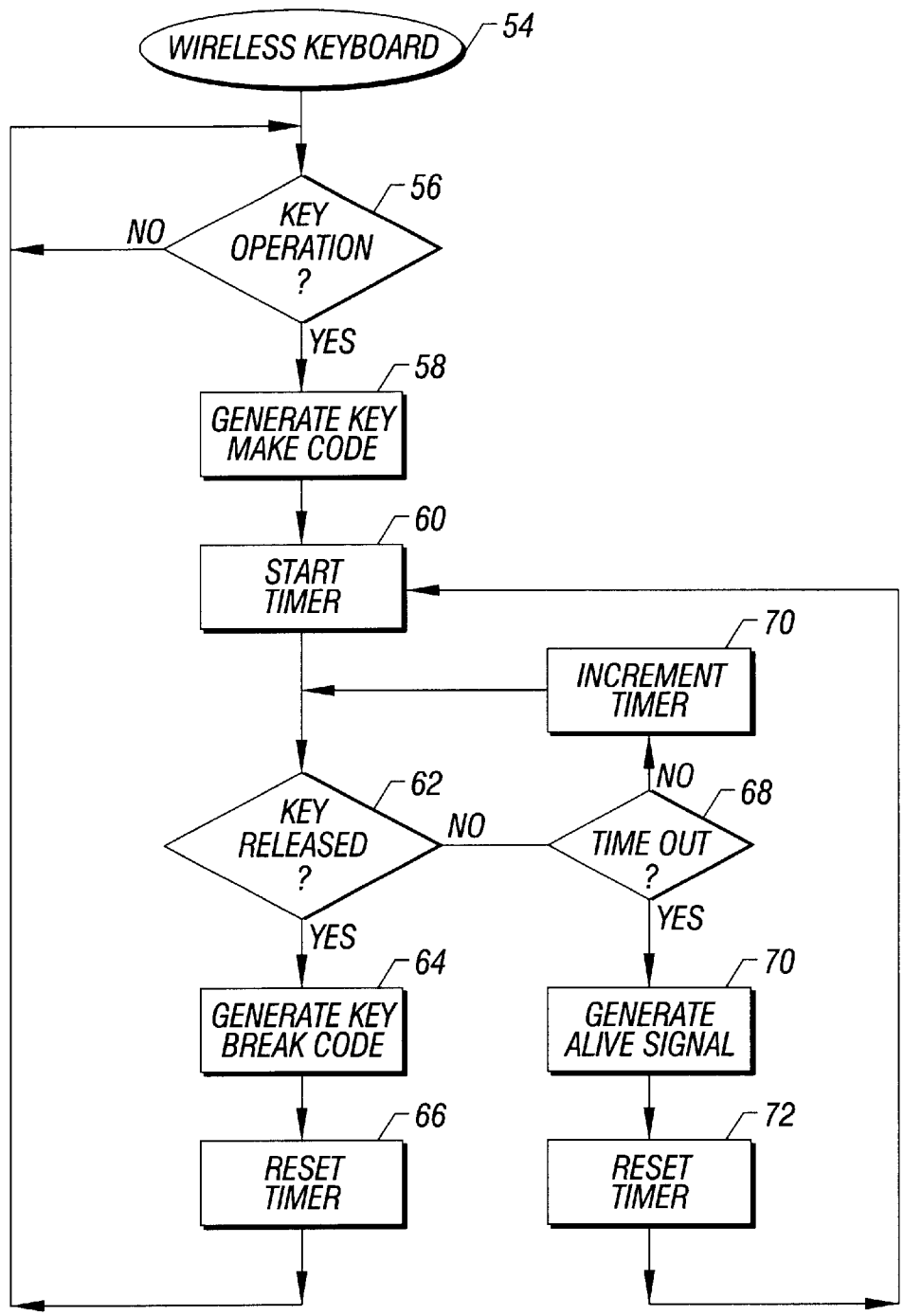
FIG. 5 is a flow chart for software for implementing a wireless keyboard in accordance with one embodiment of the invention.

Referring next to FIG. 5, software 54 which may be stored in the storage 52 begins by checking for operation of a key on the wireless keyboard as indicated in diamond 56. When a key operation is detected, a key make code is generated (block 58). Next, a timer is started as indicated in block 60. In diamond 62, a check determines whether the key which had been operated has been released. If so, a key break code is generated as indicated in block 64 and the timer is reset as indicated in block 66.

If the key was not released, as determined at diamond 62, a check determines whether or not the timer has timed out (diamond 68). If not, a timer is incremented (block 70) and the flow recycles to again check for key release. If the timer has timed out, an alive signal is generated as indicated in block 70 and the timer is reset (block 72).

Thus, some embodiments of the present invention may reduce the energy consumption of battery-powered wireless keyboards. Since the alive packet may only be sent, in some embodiments of the present invention, while the key is pressed, and at a low rate (once every half a typematic period), the keyboard need not consume energy continuously while the key is pressed. However the keyboard enables the host processor-based system to detect a lost link in a timely manner so that undesired typematics are avoided. The alive packet may also be sent at a rate slower than half the typematic period. This will stop an undesired typematic, but only after the typematic has been initiated by a host.

Embodiments of the present invention may also be useful in controlling computer games which automatically repeat a gaming action when a button is not released within some game-specific interval. In addition, the present invention may be useful in connection with buttons used to emulate cursor movements via device driver software that traps the button operation and emulates a pointing device. Such software may interpret a lack of a button release within an interval as continuous motion of the cursor.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    communicating, over a wireless link, when a key has been operated on a wireless keyboard; and
    periodically generating a wireless signal from said wireless keyboard to test whether said wireless link is still working.

2. The method of claim 1 further including starting a timer after communicating a key operation, determining whether the timer times out, and if the timer times out, automatically generating a typematic.

3. The method of claim 2 further including resetting the timer upon receipt of a key make or break code.

4. The method of claim 1 including generating said wireless signal with a period equal to half the time period which automatically produces a typematic.

5. The method of claim 1 including causing a processor-based system to automatically generate a break code when a typematic would otherwise be produced and the wireless signal generated from the wireless keyboard was not received.

6. The method of claim 1 including only generating a wireless signal after a key has been operated.

7. A wireless keyboard comprising:
    a key code generator; and
    a device to periodically produce a signal to test whether the wireless link is working.

8. The keyboard of claim 7 wherein said device produces an alive signal whenever a key make or break code is not generated.

9. The keyboard of claim 7 wherein said device produces a signal twice per typematic periodic.

10. The keyboard of claim 7 wherein said keyboard is a remote control device.

11. The keyboard of claim 7 wherein said keyboard is a cursor control device.

12. An article comprising a medium storing instructions that enable a processor-based system to:
    communicate, over a wireless link, when a key has been operated on a wireless keyboard; and periodically generate a wireless signal from said wireless keyboard to test whether said wireless link is still working.

13. The article of claim 12 further storing instructions that cause a processor-based system to start a timer after communicating a key operation, determine whether the timer times out, and if the timer times out, automatically generate a typematic.

14. The article of claim 13 further storing instructions that cause a processor-based system to reset the timer upon the receipt of a key make or break code.

15. The article of claim 12 further storing instructions that cause a processor-based system to generate said wireless signal with a period equal to half the time period which automatically produces a typematic.

16. The article of claim 12 further storing instructions that cause a processor-based system to automatically generate a break code when a typematic would otherwise be produced and the wireless signal generated from the wireless keyboard was not received.

17. The article of claim 12 further storing instructions that cause a processor-based system to produce said wireless signal only when a key is depressed on said keyboard.

* * * * *